United States Patent [19]

Rawle

[11] Patent Number: 4,586,855
[45] Date of Patent: May 6, 1986

[54] FACE MILLING CUTTER

[75] Inventor: Ralph H. Rawle, Windsor, Canada

[73] Assignee: J. P. Tool Limited, Windsor, Canada

[21] Appl. No.: 691,728

[22] Filed: Jan. 15, 1985

Related U.S. Application Data

[63] Continuation of Ser. No. 390,402, Jun. 21, 1982, abandoned.

[51] Int. Cl.⁴ .............................................. B23C 5/20
[52] U.S. Cl. ....................................... 407/55; 407/38; 407/58; 407/61
[58] Field of Search .................... 407/7, 34, 38, 39, 58, 407/59, 51, 61, 55

[56] References Cited

U.S. PATENT DOCUMENTS

| | | | |
|---|---|---|---|
| Re. 26,637 | 7/1969 | Vaughn | 29/105 |
| 2,322,578 | 6/1943 | Kutscha | 29/105 |
| 2,348,089 | 5/1944 | Niekirk | 29/105 |
| 2,426,382 | 8/1947 | Wilson | 407/39 |
| 2,584,449 | 2/1952 | Höglund | 29/105 |
| 2,885,766 | 5/1959 | Ernst et al. | 29/105 |
| 3,329,065 | 7/1967 | Vaughn | 90/11 |
| 3,464,098 | 9/1969 | Moore et al. | 29/105 |
| 3,587,150 | 6/1971 | Menard | 407/58 |
| 3,701,187 | 10/1972 | Erkfritz | 407/115 |
| 3,708,843 | 1/1973 | Erkfritz | 29/105 |
| 3,762,005 | 10/1973 | Erkfritz | 29/95 |
| 3,798,723 | 3/1974 | Czopor | 407/59 |
| 3,818,562 | 6/1974 | Lacey | 29/105 |
| 4,074,594 | 2/1978 | Dall et al. | 407/58 |
| 4,093,392 | 6/1978 | Hopkins | 407/59 |
| 4,182,587 | 1/1980 | Striegl | 407/59 |
| 4,315,706 | 2/1982 | Erkfritz | 407/101 |

FOREIGN PATENT DOCUMENTS

| | | | |
|---|---|---|---|
| 2358231 | 2/1978 | France | 407/58 |
| 144291 | 11/1980 | Japan | 407/58 |

Primary Examiner—Francis S. Husar
Assistant Examiner—Jerry Kearns
Attorney, Agent, or Firm—Neuman, Williams, Anderson & Olson

[57] ABSTRACT

A face milling tool is described including a holder securable to the end of a rotatable spindle. Cutting inserts are detachably secured to the end face of the holder at a radial distance from the axis of the spindle. The cutting edges of the inserts extend outwardly of the holder end face such that the cutting edges are free to engage and machine the surface of a workpiece. The inserts are of a wafer-like form and means are provided for detachably securing the inserts to the holder through a central axial aperture in the inserts. The securing means lies within the outer end face of each insert and the cutting edge of each is substantially straight, being formed by a portion of an edge at the intersection of the insert side wall and the end face. Each insert lies at such an angle to the plane of the workpiece that the insert side wall forms a rake face and the outer end face of the insert forms a clearance face and the straight cutting edge lies at a small radial shear angle. The inserts are circumferentially spaced around the holder and are axially and radially stepped to form both an axial and radial progression, whereby each insert removes a shallow uniform workpiece chip and the material is removed progressively from the top surface of a workpiece down to a finished surface in controlled, shallow, axial increments of less than 0.01 inch.

12 Claims, 10 Drawing Figures

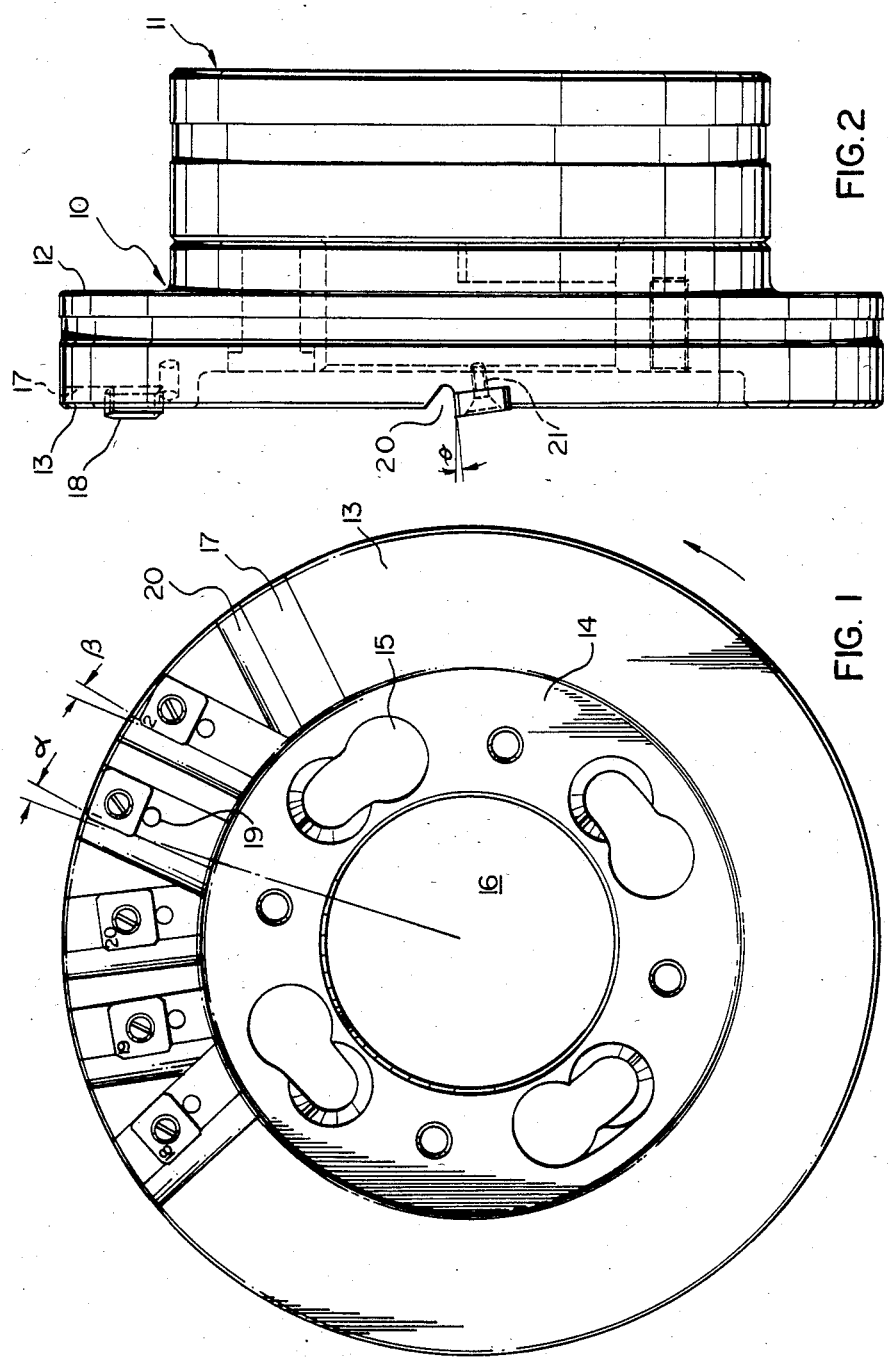

FACE MILLING CUTTER

This application is a continuation of application Ser. No. 390,402, filed June 21, 1982, and now abandoned.

This invention relates to milling cutters and, more particularly to face milling tools primarily for metals.

A typical milling tool comprises a holder securable to the end of a rotating spindle in a predetermined relationship to the axis of rotation thereof and a short cutting edge carried by the holder at a radial distance from the axis of rotation on the side of the holder away from the spindle, so that as the body is rotated by the spindle, the cutting edge describes a circle about the axis of the spindle. All parts of the holder are axially and radially behind the cutting edge so that it is free to engage and machine the surface of a workpiece held in the machine in which the spindle rotates. Since the cutting edge is short it takes a comparatively narrow cut and the tool is used with a transverse feed, i.e. the feed direction is parallel to the machined surface of the workpiece.

It has in the past been proposed to make a tool bit of wafer-like form for a variety of metal cutting tools. In other words, it is bounded by two generally flat parallel end faces and a side wall and has at least one cutting edge formed by part of the edge at the junction of the side wall and at least one of the end faces. It is of a thickness which is small compared to other dimensions and is typically secured detachably to a holder by means transversing a central aperture through it. If such a bit is of simple form and small size, it is cheap to produce and it is therefore economic to throw it away when blunt or worn rather than regrinding it, especially if it can be indexed to bring each of a plurality of cutting edge sections or cutting edges into cutting position.

In general terms, the two surfaces at the junction of which the cutting edge of a metal cutting tool is formed, are (a) the rake face against which the chip impinges and (b) the clearance face which is the face which is closer to the workpiece and which is inclined to the machined surface at a low angle which takes it out of contact with workpiece behind the cut. In the case of a wafer-like cutter as described above, according to the way it is located by the holder and the machine, it is possible for one end face to be the rake face and the side wall to be the clearance face, or for the side wall to be the rake face and the end face to be the clearance face. In the specific case of face milling cutters, nearly always a wafer-like cutter has been located so that the end face is the rake face and the side wall is the clearance face.

Nearly every milling operation consists of an interrupted cut. Normally, each cutting insert is in the cut less than half of the total machining time and, while the insert is in the cut, the thickness of the chip being formed constantly changes because of the dual motion, i.e. cutter rotation and workpiece feed motion, which is characteristic of the milling process. These features of milling operations result in the following cutting conditions:

1. As each insert enters the cut, it is subjected to a mechanical shock load. The magnitude of this shock load depends upon the workpiece material, cutter position, operating conditions and cutter geometry.

2. Cutting forces are cyclical, and are roughly proportional at any position in the cut to the undeformed chip thickness at that position. In a typical milling operation, undeformed chip thickness at insert entry is about 80% of the feed per insert, so forces begin high, build up gradually and finally peak as the insert crosses the feed axis, i.e. the point at which unformed chip thickness is at a maximum. Forces decline throughout the rest of the cut as undeformed chip thickness is constantly reduced. As the insert leaves the cut, forces drop to zero and remain there until the insert enters the cut again on the next spindle revolution.

3. Heat generated in the machining operation is also roughly proportional to the undeformed chip thickness. Thus, it is roughly proportional to the rapidly changing cutting forces. Such rapid changes in generated heat place a severe strain upon the cutting material and can lead to thermal cracking.

As an example of one of the previous milling cutters there can be mentioned the face milling tool described in U.S. Pat. No. 3,670,380, issued June 20, 1972. This tool utilizes a single face cutting insert of circular or lobed outline which is utilized essentially as a finishing insert. Thus, the disclosure of that patent points out that if the depth of material to be removed at one pass is greater than the insert can deal with, the holder can also carry one or more roughing bits which precede the circular or lobed insert.

It is an object of the present invention to provide a face milling tool which can remove metal from the surface of a workpiece with decreased horsepower requirements and decreased stress on the workpiece and cutting inserts, with resultant greatly increased insert life.

SUMMARY OF THE INVENTION

The present invention relates to a face milling tool comprising a holder securable to the end of a rotatable spindle. A plurality of cutting inserts, each having at least one cutting edge, are detachably secured to the end face of the holder at a radial distance from the axis of the spindle. The cutting edges of the inserts extend outwardly of the holder end face such that the cutting edges are free to engage and machine the surface of a workpiece. The inserts are of a wafer-like form and means are provided for detachably securing the inserts to the holder through a central axial aperture in the inserts. The securing means lies within the outer end face of each insert and the cutting edge of each is substantially straight, being formed by a portion of an edge at the intersection of the insert side wall and the end face. Each insert lies at such an angle to the plane of the workpiece that the insert side wall forms a rake face and the outer end face of the insert forms a clearance face making a low angle to the plane of the workpiece disposed perpendicularly to the spindle axis. The straight cutting edge makes a small angle with a radius intersecting the cutting edge and the spindle axis, this being referred to hereinafter as the shear angle. The inserts are circumferentially spaced around the holder and are axially and radially stepped to form both an axial and radial progression, whereby each insert removes a shallow uniform workpiece chip and the material is removed progressively from the top surface of a workpiece down to a finished surface in controlled, shallow, axial increments.

As stated above, the inserts are circumferentially spaced around the holder and are axially and radially stepped to form both an axial and radial progression. It is an important feature of the present invention that the axial steps between successive inserts be very small. Preferably each axial step is less than about 0.01 inch, with axial steps in the range of 0.002 to 0.005 inch being particularly preferred with cast iron or steel workpieces.

With the axial and radial stepped configuration, a spiralling effect is created with only one insert serving as a finishing insert. The number of inserts required is based on the stock removal and the axial step or chip load. The axial geometry of the inserts is arranged to suit the insert style and the metal being machined and the radial geometry is arranged to eliminate harmonics and minimize breakout.

The milling tool of this invention has a number of advantages over previous systems. For instance, it produces a part with better flatness. It also produces a highly desirable dull, non-glazed finish, as compared with shiny, glazed finishes produced by traditional milling cutters. However, its most important feature is greatly improved tool life. Thus, as many as 10,000 workpieces can be machined with one cutting edge using the present invention and this compares with about 1800 workpieces machined with one cutting edge using a traditional milling tool.

Certain preferred embodiments of the invention will be further described with reference to the accompanying drawings in which:

FIG. 1 is a plan view from below of a face milling tool of the present invention;

FIG. 2 is a side elevation of the milling tool of FIG. 1;

Figure 4:
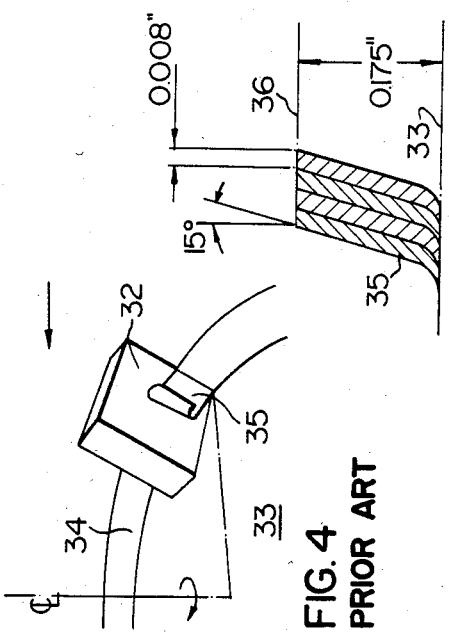
FIG. 4 is a perspective illustration of the cutting action shown in FIG. 3.

The face milling tool in accordance with the invention shown in FIGS. 1 and 2 comprises a body or holder 10 mounted on a spindle 11. The holder has a rim portion 12 with an annular face 13, an inwardly stepped annular portion 14 and a central hole 16. The holder 10 is mounted to the spindle 11 by means of studs which pass through the slotted holes 15.

In the annular face 13 are formed a plurality of slots 17 which are adapted to retain cutter inserts 18. An abutment 19 is provided in each slot 17 to precisely control the location of each cutter insert within a slot 17. Immediately forward of each slot 17 is a chip relief groove 20.

Each cutter insert is fixed in position by means of a screw 21.

As will be seen from FIG. 2, each insert 18 is set at a rake angle $\theta$ relative to the surface of the workpiece. This angle is typically less than 15° and is usually in the order of about 7°.

Figure 10:
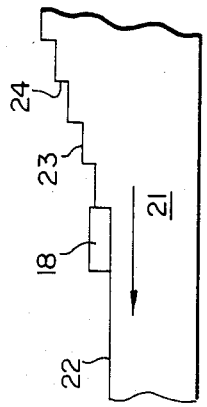
FIG. 10 is a schematic illustration of the cutting action of the present invention on a workpiece.

The manner in which the inserts engage the workpiece according to this invention can be seen from FIG. 10. One of the group of stepped inserts 18 is shown engaging the workpiece 21 and this is the last or finishing insert which provides the finished surface 22. The other inserts are stepped both axially and radially to provide the stepped cuts each with a wide face 23 parallel to the feed direction and a shallow edge 24 perpendicular to the feed direction. In other words, wide, shallow chips are removed.

The inserts may engage the metal workpiece at either a positive or negative axial rake angle, this depending on the nature of the metal being processed. Such metals may include cast iron, steel, aluminum or magnesium.

The inserts are mounted such that the straight cutting edge makes a small radial shear angle. Preferably these shear angles progressively alternate between small positive and negative angles. These radial shear angles can be seen in FIG. 1, with insert 1 being set at a small negative angle $\alpha$ and insert 2 being set at a small positive angle $\beta$. These alternating angles continue through inserts 3 through 20. The angles $\alpha$, $\beta$ can each be up to about 15° with about 7° being ideal.

The inserts can be manufactured from the usual cutting tool materials on the market today, with tungsten carbide being the preferred material. The inserts can come in a variety of shapes and sizes with square, rectangular or triangular being generally preferred. The size of the inserts is generally based on the feed per revolution to fully utilize the available cutting edge. They are also preferably indexable and, for instance, a square insert may have eight cutting edges and preferably has bevelled, radius or sharp corners.

Figure 3:
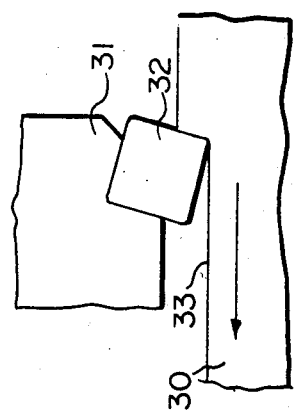
FIG. 3 is a diagrammatic illustration of a typical prior art cutting insert configuration.

In order to see the advantages of the present invention over the prior art, reference is made to FIGS. 3 to 7 which illustrate the prior art. FIGS. 3 and 4 show a cutting insert in operation in a traditional arrangement. Thus, a holder 31 supports an insert 32 set at an angle, with the insert cutting the workpiece 30 in the manner shown in FIG. 4 to provide a finished face 33. It will be seen from these Figures that the insert 32 is cutting in primarily a radial direction so that a deep chip 35 is being removed along the cutting face 34.

Figure 5:
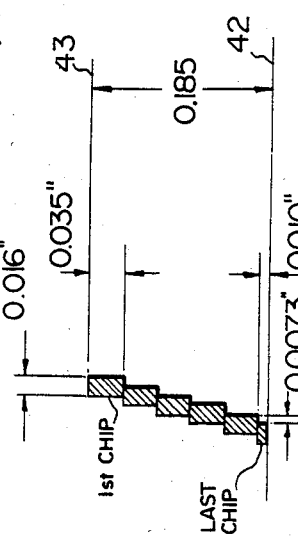
FIG. 5 is a schematic illustration of the chip removal using the cutting action of FIGS. 3 and 4.
Figure 7:
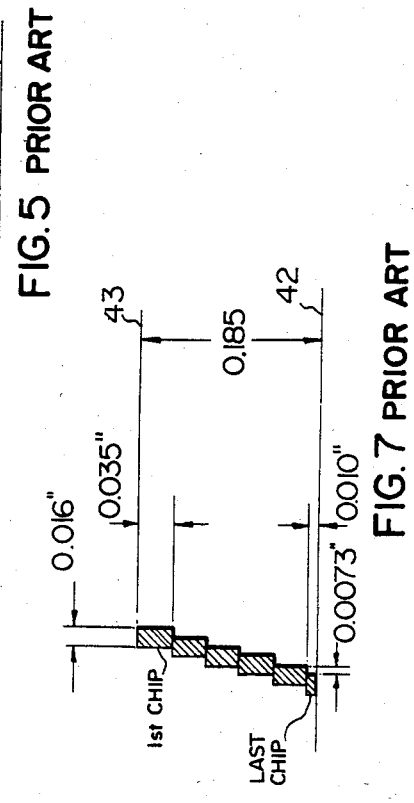
FIG. 7 is a schematic illustration of the chip removal using the cutting action of FIG. 6.

With a typical milling tool arranged in the above manner having 8 teeth mounted in the holder, the chip removal was as shown in FIG. 5. The spindle was rotated at 280 rpm giving a cutter rate of 440 surface feet per minute. With this arrangement the workpiece could be fed at a feed rate of 0.064 inch per revolution or 0.008 inch per insert with a depth of cut of 0.175 inch. As seen in FIG. 5, the feed per insert is the thickness of a chip 35 and the depth of cut is the distance between the finished face 33 and the top surface of the metal to be removed 36. This provided a workpiece feed rate of 17.92 inches per minute.

Figure 6:
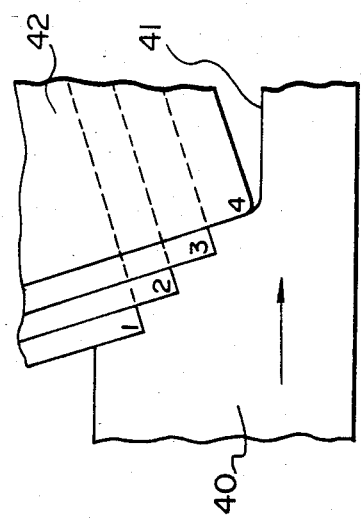
FIG. 6 is a schematic illustration of the insert arrangement of a previous step-mill.

Another form of known milling tool is illustrated in FIG. 6 and this a so-called "step mill". In this arrangement the cutting inserts 42 are not tracked evenly, but positioned several thousands of an inch apart (stepped) radially and axially. The stepped arrangement is designated by the numerals 1, 2, 3 and 4, showing four of the six steps. Such an arrangement is recommended for applications requiring larger depth of cut at reduced horsepower consumption. Each insert 42, being individually stepped in a radial and axial direction, provides uniform chip distribution and free cutting, while reducing work hardening. These step cutters can be used on all types of milling machines, but have been found to be especially effective on lower horsepower machines. However, they utilize the same chip removal action as is shown in FIGS. 3-5 with the inserts 42 cutting the workpiece 40 in a radial direction to provide the finished face 41 and they suffer from the very serious disadvantage of requiring a very slow workpiece feed rate.

A typical step mill of the above type having six teeth was operated at 280 rpm, giving a surface feet per minute of 440. With this arrangement there was a feed rate in inches per revolution of 0.016 and for a total depth of cut of 0.185 inch, it was possible to operate at a feed rate of only 4.5 inches per minute. As will be seen in FIG. 7, each of the first five chips has a thickness of 0.035 inch, while the last chip has a thickness of 0.010 inch, giving the total depth of cut of 0.185 inch between the top surface of the material to be removed 43 and the finished surface 42. The length of each chip was 0.016 inch and the radial stagger was 0.0075 inch.

Figure 9:
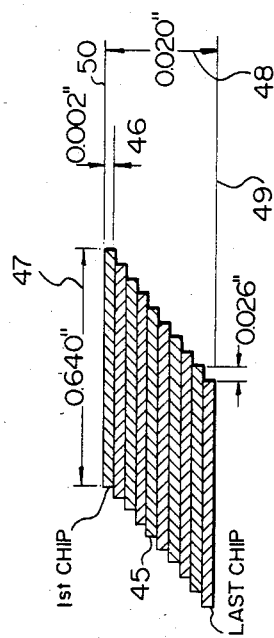
FIG. 9 is a schematic illustration of the chip removal using the cutting tool of FIG. 8.
Figure 8:
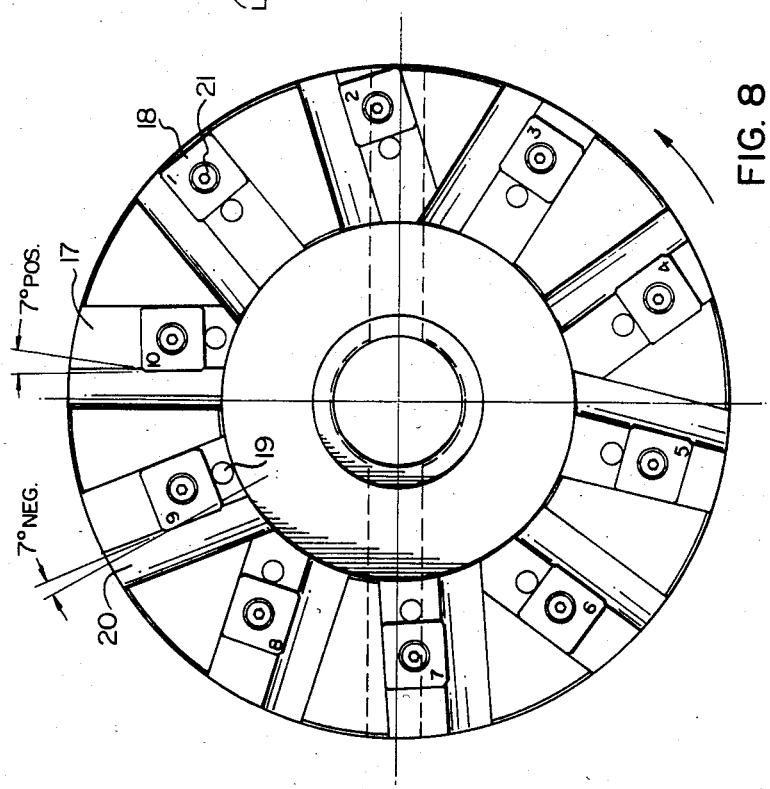
FIG. 8 is a plan view of a further embodiment of the face milling tool of the present invention.

Another unit was utilized of the type shown in FIGS. 1 and 2 but with 10 equally spaced inserts as shown in FIG. 8. Square inserts were used which were ⅜" square, 5/16" thick and with 0.031 R corners. The inserts were mounted at a rake angle of 7° and alternating negative and positive radial shear angles of 7°. The inserts were axially stepped by a distance of 0.002 inch and radially stepped by an amount of 0.090 inch. The ten stepped inserts are shown by the numerals 1-10 with insert #1 removing the first chip and insert #10 removing the last chip. The chip removal is illustrated in FIG. 9, from which it will be seen that each chip 45 has a thickness 46 of 0.002 inch and a length 47 of 0.640 inch and the radial step in on the part is 0.026 inch. The total depth of cut 48 between the workpiece finished face 49 and the top surface of the material to be removed 50 is 0.020 inch. This arrangement operated at a feed rate of 144 inches per minute. In other words, it has a feed rate 30 times that of the step cutter of FIG. 6 and almost 8 times the rate of the traditional cutter of FIGS. 3 and 4.

EXAMPLE

A series of tests were conducted on cast iron workpieces using face milling tools according to the invention of 3", 4", 5" and 6" diameters. They were arranged as follows:

| DIA. | NO. OF INSERTS | ROUGH STOCK REMOVAL | FINISH STOCK REMOVAL | MAXIMUM FEED/ REV. |
|---|---|---|---|---|
| 3" | 6 | 0.024" | 0.012 | 0.350 |
| 4" | 8 | 0.032" | 0.016 | 0.350 |
| 5" | 10 | 0.040" | 0.020 | 0.350 |
| 6" | 10 | 0.040" | 0.020 | 0.640 |

The results obtained were as follows:

| DIA. | 3" | 4" | 5" | 6" |
|---|---|---|---|---|
| SFM | 370 | 450 | 445 | 450 |
| RPM | 480 | 430 | 340 | 225 |
| FEED/REV. | 0.35" | 0.35" | 0.35" | 0.64" |
| FEED (IN./MIN.) | 168.0 | 150.5 | 119.0 | 144 |
| STOCK REMOVAL (CU.IN.MIN.) | 4.03 | 6.41 | 7.93 | 11.52 |
| H.P. | 2.47 | 5.73 | 5.66 | 6.85 |

I claim:

1. A face milling tool securable to a rotatable spindle and used to machine a workpiece, said tool comprising:
    a plurality of cutting inserts having a first end face forming a bottom face, a second end face forming a clearance face, and a side face forming a rake face which intersects said clearance face to form a substantially straight cutting edge at the line of intersection;
    a holder and means securing said holder to said rotatable spindle, said holder having an end face and a plurality of seats formed in said end face for receiving the bottom face of said cutting inserts, said seats being spaced radially from the longitudinal axis of said spindle and circumferentially around said spindle axis and being stepped radially and axially around the spindle axis;
    means securing said inserts to said holder to place the cutting edges of said inserts perpendicularly to the longitudinal axis of said spindle and at a radial shear angle, to place the clearance faces at a shallow angle axially inward, to place the rake faces at an axial rake angle, and to place the cutting edges in an axially stepped relation whereby said inserts engage the workpiece and remove shallow and uniform workpiece chips progressively and axially of said spindle from the top surface of the workpiece down to a finished surface in controlled shallow axial increments.

2. A face milling tool according to claim 1 wherein each insert is set at an axial rake angle of less than about 15°.

3. A face milling tool according to claim 2 wherein each straight cutting edge forms a radial shear angle of less than about 15°.

4. A face milling tool according to claim 3 wherein the radial shear angles of successive inserts are alternatively positive and negative.

5. A face milling tool according to claim 1, 2 or 3 wherein the axial spacing between successive inserts is up to 0.01 inch.

6. A face milling tool according to claim 1, 2 or 3 wherein the axial spacing between successive inserts is in the range of 0.002 to 0.005 inch.

7. A face milling tool according to claim 1, 2 or 3 wherein the inserts are square, each with eight indexable cutting edges.

8. A face milling tool according to claim 1, 2 or 3 wherein the inserts are mounted at a negative axial rake angle.

9. A face milling tool used to machine a workpiece, said milling tool comprising:
    a rotatable spindle;
    a plurality of cutting inserts having a first end face forming a bottom face, a second end face forming a clearance face, and a side face forming a rake face which intersects said clearance face to form a substantially straight cutting edge at the line of intersection;
    a holder and means securing said holder to said rotatable spindle, said holder having an end face and a plurality of seats formed in said end face for receiving the bottom face of said cutting inserts, said seats being spaced radially from the longitudinal axis of said spindle and circumferentially around said spindle axis, being stepped radially and axially at predetermined increments around the spindle axis to radially and axially step the cutting edges of the inserts which the seats receive whereby said inserts engage the workpiece and remove shallow and uniform workpiece chips progressively and axially of said spindle from the top surface of a workpiece down to a finished surface in controlled shallow axial increments, and being inclined axially at an angle of less than 15° to provide an axial rake angle and a clearance angle for the inserts which the seats receive;

means securing said inserts to said holder so that said cutting edges of said inserts are disposed perpendicularly to the spindle axis and at a radial shear angle.

10. A face milling tool according to claim 9, wherein each axial increment is in the range of 0.002 to 0.005 inch.

11. A face milling tool according to claim 9 or 10 wherein the axial rake angle and radial shear angle are each about 7°.

12. A face milling tool holder having means for securing said holder to a spindle for holding a plurality of wafer-like cutting inserts, each insert having a first end face forming a bottom face, a second end face forming a clearance face, and a side face forming a rake face which intersects the clearance face to form a substantially straight cutting edge at the line of intersection, said holder comprising: an end face and a plurality of seats formed in said end face for receiving the bottom face of said cutting inserts, said seats being spaced radially from the longitudinal axis of said spindle and circumferentially around said spindle axis, being stepped radially and axially at predetermined increments around the spindle axis to radially and axially step the cutting edges of the inserts which the seats receive whereby said inserts engage the workpiece and remove shallow and uniform workpiece chips progressively and axially of said spindle from the top surface of a workpiece down to a finished surface in controlled shallow axial increments, and being inclined axially at an angle of less than 15° to provide an axial rake angle and a clearance angle for the inserts which the seats receive.

* * * * *